(12) United States Patent
Thompson

(10) Patent No.: US 7,216,439 B2
(45) Date of Patent: May 15, 2007

(54) LENGTH MEASURING METHOD AND DEVICE

(75) Inventor: Rocke P. Thompson, Bountiful, UT (US)

(73) Assignee: Techxotic LC, Clearfield, UT (US)

( * ) Notice: Subject to any disclaimer, the term of this patent is extended or adjusted under 35 U.S.C. 154(b) by 0 days.

(21) Appl. No.: 11/067,467

(22) Filed: Feb. 25, 2005

(65) Prior Publication Data

US 2006/0191153 A1 Aug. 31, 2006

(51) Int. Cl.
*G01B 5/04* (2006.01)

(52) U.S. Cl. .......................... 33/735; 33/746

(58) Field of Classification Search .............. 33/735, 33/732, 733, 734, 736, 737, 738, 739, 743, 33/745, 746

See application file for complete search history.

(56) References Cited

U.S. PATENT DOCUMENTS

| | | | |
|---|---|---|---|
| 197,080 A * | 11/1877 | Barse et al. ............... 33/745 |
| 3,116,886 A * | 1/1964 | Kuehne ................. 33/1 PT |
| 3,372,908 A | 3/1968 | McCarthy |
| 3,520,062 A * | 7/1970 | Tanguy ..................... 33/734 |
| 3,690,123 A | 9/1972 | Delair et al. |
| 3,732,623 A | 5/1973 | Bopst, III |
| 3,739,996 A | 6/1973 | Matsui et al. |
| 3,988,879 A | 11/1976 | Franzolini et al. |
| 3,999,739 A | 12/1976 | Vick et al. |
| 4,285,131 A | 8/1981 | Demchak et al. |
| 4,325,537 A | 4/1982 | Winter et al. |
| 4,570,348 A * | 2/1986 | Amsler et al. ............... 33/734 |
| 4,614,332 A | 9/1986 | Wilson |
| 4,660,036 A * | 4/1987 | Mosier .................. 33/1 PT |
| 4,760,993 A | 8/1988 | Du Preez |
| 5,065,527 A | 11/1991 | Shaw |
| 5,249,543 A | 10/1993 | Rutgerson et al. |
| 5,348,116 A | 9/1994 | Pickering |
| 5,725,200 A | 3/1998 | Gordon |
| 6,481,695 B1 | 11/2002 | Fuller |
| 6,595,454 B2 | 7/2003 | Roba et al. |
| 6,595,462 B2 | 7/2003 | Lenski et al. |
| 6,964,102 B2 * | 11/2005 | Schroder .............. 33/1 PT |

OTHER PUBLICATIONS

U.S. Appl. No. 10/977,320 entitled "Snatch Block, Snatch Block Assembly and Method of Use," filed Oct. 29, 2004.
Pasco, "Rotary Motion Sensor," Feb. 2004, 3 pages.
Pasco, "Photogate/Pulley System," Feb. 2004, 2 pages.
Kubler, "Linear Measuring Technology, Draw wire," date unknown, pp. 178-183.

(Continued)

*Primary Examiner*—Christopher W. Fulton
(74) *Attorney, Agent, or Firm*—TraskBritt, PC

(57) ABSTRACT

Devices configured to measure a length of rope moving through the device are disclosed. The devices of the present invention employ a sheave mounted for rotating within a housing. A rotation measuring assembly may determine the number of rotations of the sheave, and, thus, information about the length of the rope passing through the device. Information such as net rope length, gross rope length, current rope speed, maximum rope speed, or total rope length displaced during a certain period may be determined and displayed. A signaling device is configured to communicate the information.

23 Claims, 7 Drawing Sheets

OTHER PUBLICATIONS

Accurate Duplicators, "Digital Audio Cassette Duplication," Feb. 2004, 1 pages.
cbl materials, "T1-82 Calculator," Feb. 2004 2 pages.
Reed Relays and Electronics India Limited, "Reed Sensors in Electric Fishing Reels," May 2004, 1 page.
Reed Relays and Electronics India Limited, "Reed Switch Applications in Sports and Recreation," May 2004, 3 pages.
Petzl Work solutions, "FIXE—Pulley with fixed side-pieces," Sep. 2004, 1 page.
Petzl Work solutions, "Rescue—Swing-sided pulley," Sep. 2004, 1 page.
Petzl Work solutions, "Pro Traxion—Highly efficient self-jamming pulley," Sep. 2004, 1 page.
Black Diamond Equipment, "Pulley," Sep. 2004, 1 page.
Sterling Rope, "Bi-Color Rope," Sep. 2004, 1 page.
Bent Gate Mountaineering, "10.2mm×60M Dry Bi-Color Climbing Rope by Sterling," Sep. 2004, 1 page.

* cited by examiner

LENGTH MEASURING METHOD AND DEVICE

BACKGROUND OF THE INVENTION

1. Field of the Invention

The present invention relates to a method of measuring the length of an elongated, flexible element such as a rope, line or cable and a device for measuring and communicating the measured length or information determined from such measurement about a rope or other elongated, flexible element passing through the device.

2. State of the Art

Pulleys are used for various applications in many different activities. Pulleys may be used with outdoor recreational activities, such as rock climbing, mountaineering, sailing, caving, and mountain rescue work. However, pulleys are also employed in other applications, such as in rescue work in urban and industrial settings, in safety restraints in urban and industrial settings, in law enforcement work, in tree climbing, and in military applications, among many other applications. The foregoing activities will be referred to herein individually and collectively as "climbing applications."

Generally, a pulley has a frame and a sheave or wheel that rotates on a bearing carried on an axle or pin. A pulley used for hauling a load or rescue conventionally includes an attachment point for a carabiner, facilitating maneuvers and temporary installation. Conventionally, both static ropes and dynamic ropes are used in conjunction with pulleys in climbing applications. Static ropes or "Low Stretch" ropes conventionally stretch less than 4 percent when loaded with a 200 pound load and many will stretch less than 2 percent at this load. Dynamic ropes are designed to stretch and absorb a portion of the impact force in a fall.

The ropes, both static and dynamic, used in climbing applications, conventionally do not include markings for incremental measurement of the rope length. Ropes having a middle marker are available. For example, Sterling Rope Company, Inc. of Scarborough, Me. offers a bi-color rope, changing the color of the rope at the center to aid in finding the middle of the rope, which may be critical in rappelling, or descending, applications.

Knowing the length of a portion of a rope being employed in an indoor or outdoor rock climbing situation, a search and rescue operation, industrial rescue operation, or other situation may be useful. The length of a given rope portion may be used to determine the length of the remaining portion of a rope of a standard or known length, or to determine the distance an object attached to the rope has traveled. For example, in a rescue situation, a rescuer may be lowered down a cliff to a victim, and knowing the distance to the victim may be useful for other rescue team members. In a rock climbing situation, it may be useful for a climber ascending a cliff to know the distance ascended, in order to determine if the same rope, doubled over, may be used to descend, or "rappel," the cliff. Alternatively, it may be useful for a climbing partner on the ground, managing the ropes, or "belaying" to determine if the same rope may be used to lower the climber from his or her high point to the ground, on the same rope. Many climbers have been injured after being lowered off the end of a rope, then plummeting to the ground below.

In view of the foregoing, it appears that a portable device for determining the length of a rope or a portion of a rope would be useful.

BRIEF SUMMARY OF THE INVENTION

The present invention, in a number of embodiments, includes devices, such as pulleys, that a rope may be run through to determine rope length and other information about the movement of the rope. As used herein, the term "rope" includes and encompasses elongated, flexible elements such as, without limitation, ropes, lines and cables.

In an exemplary embodiment, a device having a housing configured for allowing a rope to move therethrough and a sheave mounted for rotation within the housing is disclosed. A rotation measuring assembly is carried by the housing for measuring a quantity of rotations of the sheave, and a signaling device carried by the housing may communicate information relating to a length of rope moving through the rotation measuring device responsive to the quantity of rotations.

A magnet may be affixed to the sheave in a position configured to selectively activate the rotation measuring assembly. In one example, at least one reed switch on a circuit board is activated when the magnet passes in proximity thereto. The circuit board may be in communication with the signaling device.

In an exemplary method of measuring the length of a rope used in a climbing application, the rope may pass through a device having a sheave, causing the sheave to rotate. The number of rotations of the sheave may be determined and, thus, the length of rope passed through the device may be determined. The method further includes signaling the length.

Another exemplary embodiment of a device for communicating information about an elongated, flexible element passing therethrough comprises a sideplate, a pin projecting from the sideplate, a sheave mounted for rotation about the pin and including a stimulation device, a sensory device carried by the sideplate, the sensory device activatable by the stimulation device for measuring the rotation of the sheave, and a signaling device carried by the sideplate for communicating the information about the elongated object, determined using the rotation of the sheave.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

The present invention, in a number of embodiments, includes a pulley having associated structure for measuring a length of rope. The rope may be pulled over a sheave of a known circumference rotatably mounted to the pulley, the number of turns of the sheave determined, and converted to the length of rope which has passed through the pulley, which length may be signaled. The term "pulley" is used herein to describe any device configured to allow rope to pass therethrough, and is not necessarily a device which changes the direction or point of application of a force applied to the rope.

Figure 1:
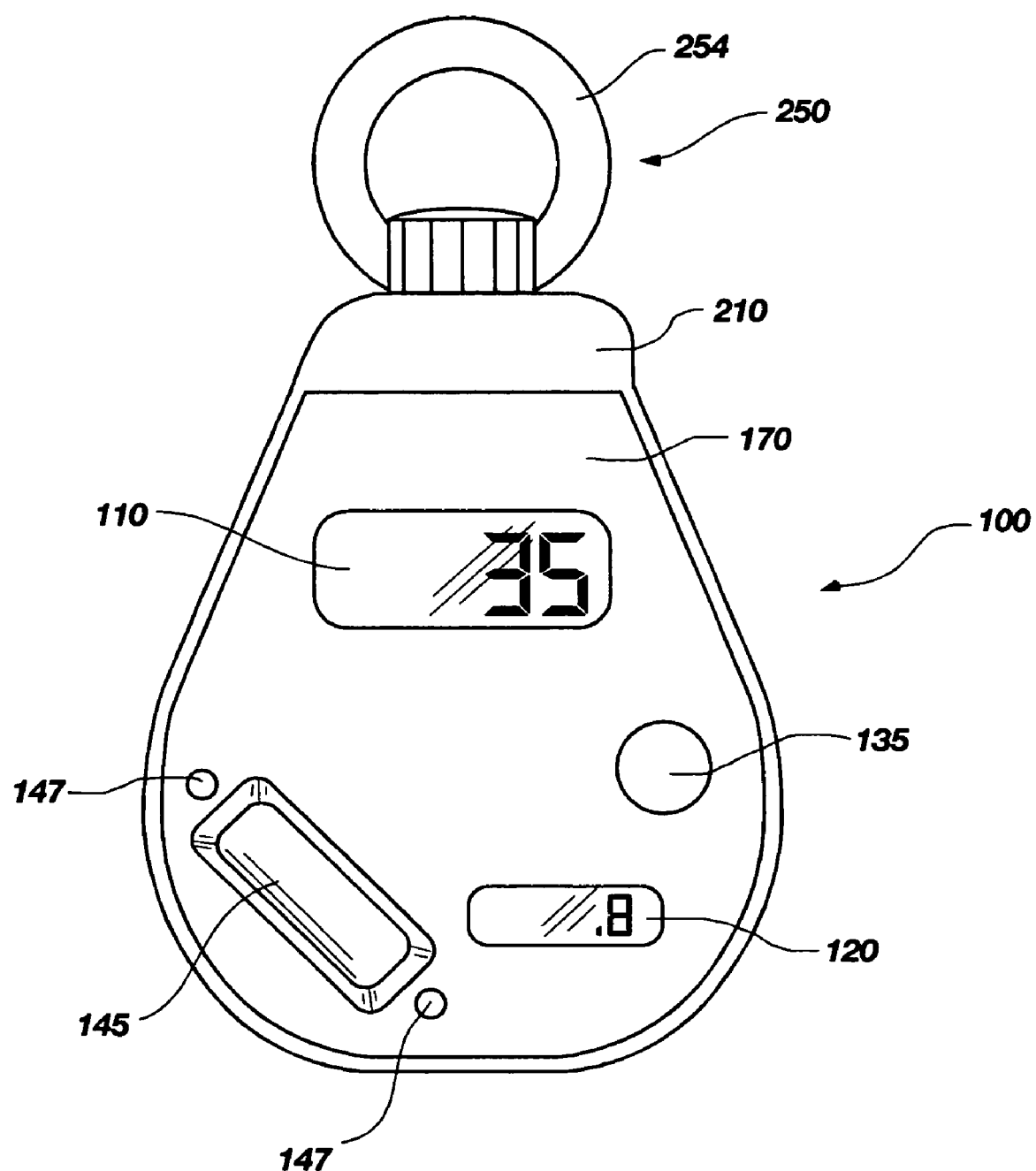
FIG. 1 illustrates an exemplary embodiment of a device of the present invention.

One exemplary embodiment of a length measuring device according to the present invention is a pulley 100, depicted in FIG. 1. The pulley 100 includes a first signaling device 110 and a second signaling device 120. In this embodiment the signaling devices comprise digital LCD screens, but it is understood the signaling device may take other forms in lieu of or addition to those illustrated, for example an analog display or an auditory signal. The signal may be used to communicate information, for example, net rope length, gross rope length, current rope speed, maximum rope speed, or total rope length displaced during a certain period. The length or speed may be determined and/or displayed, for example, in feet, meters, feet per second, or meters per second. Optionally, only one signaling device, or more than two signaling devices, may be provided. The first signaling device 110 may be larger and substantially centrally positioned on the surface of the pulley 100. The second signaling device 120 device may be smaller and communicate different information; for example, the first signaling device 110 may communicate the total rope length and the second signaling device 120 may communicate the current rope speed.

An on/off switch 135 may be used to prolong the life of a power source, for example a battery 45 (FIG. 5) when the device is not in use, and may additionally function to zero the rope length at any time. Alternative methods of zeroing or resetting the rope information maybe provided. The battery 45 may be contained within the housing of pulley 100 by a battery cover 145, secured in place with fasteners 147. The battery 45 may be accessed, for example, for replacement, by loosening the fasteners 147 and releasing the battery cover 145.

Figure 2:
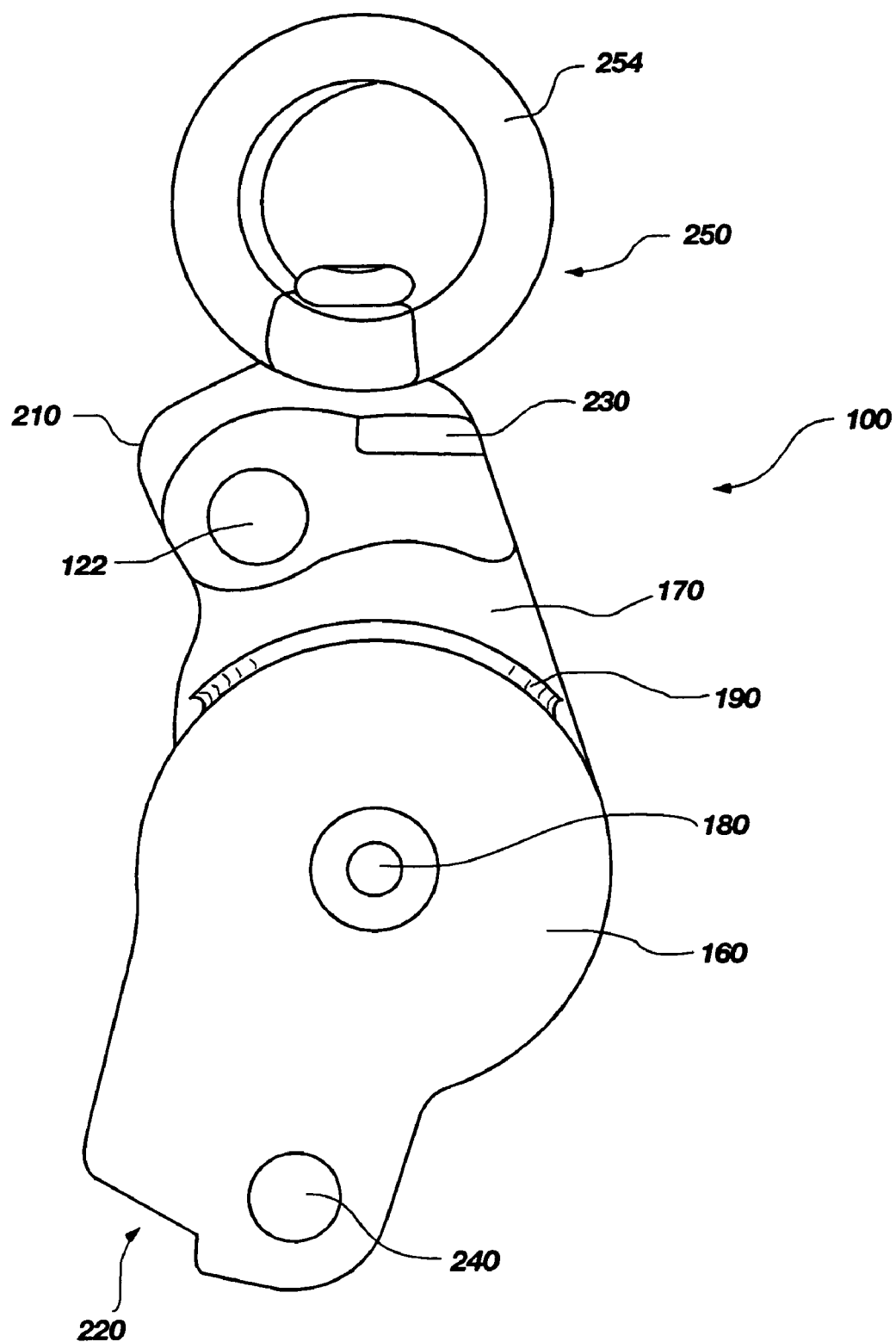
FIG. 2 illustrates another view of the device of FIG. 1.

FIG. 2 depicts the pulley 100 from another angle, in an open position to receive a bight of a rope. One suitable example of a pulley which may be opened to receive a bight of rope is disclosed in application Ser. No. 10/977,320, filed on Oct. 29, 2004, the disclosure of which application is incorporated by reference herein. Any suitable configuration of a pulley which may be opened is within the scope of the present invention, as well as a pulley configuration which does not open, wherein the rope may be inserted by threading a rope end through the pulley between the sideplates and over the sheave. The pulley 100 includes a first sideplate 160 and a second sideplate 170 (also shown in FIG. 1) oriented substantially parallel thereto, the first and second sideplates 160 and 170 spaced apart by a pin 180. The second sideplate 170 is secured to an assembly head 210. The first sideplate 160 is mounted to pivot with respect to the assembly head 210 about the pin 180. The pulley 100 is shown in FIG. 2 with the first sideplate 160 in an open position, enabling a bight of rope (not shown) to be inserted. In the closed position of the pulley 100, a retaining device or mechanism shown schematically as a button 122, engages the first sideplate 160, preventing the first sideplate 160 from returning to the open position unless the retaining device is disengaged by a user.

The retaining device may be a quick-release device, such as a device that requires only a single motion of a user's hand for disengagement, followed by rotation of first sideplate 160. One example of a quick-release device is the button 122 that is spring-loaded toward first sideplate 160 in a direction transverse to the planes of the sideplates 160 and 170. The button 122 is configured to engage with an aperture 240 located in the first sideplate 160, retaining the first sideplate 160 in position with respect to the second sideplate 170 and the assembly head 210.

By way of a specific and nonlimiting example, a user may grasp the first sideplate 160 at sides thereof using the thumb and a finger of the same hand, such as the third finger, depress button 122 with the index finger of the same hand, and rotate or pivot the first sideplate 160 in a first direction with a turn of the wrist to an open position. A bight of rope may be inserted between the first and second sideplates 160 and 170 and over sheave 190, and the first sideplate 160 then grasped as before and rotated in the opposing direction to a closed position until engaged by button 122.

The pulley 100 includes an attachment device 250. The attachment device 250 enables the pulley 100 to be connected to an anchor point, such as another structure, a tree, a rock, etc. The attachment device 250 is depicted to include a ring 254; however an attachment device including a hook, a shackle, or the like is encompassed within the scope of the invention. The attachment device 250 may be configured to swivel about an axis of rotation other than that of the sheave 190 of the pulley 100, for example, substantially transverse thereto. The swivel action may prevent ropes used in rigging activities in conjunction with the pulley 100 from becoming twisted. The swivel action may additionally enable the pulley 100 to be positioned to display the signaling devices 110, 120. The attachment device 250 is independent from the opening mechanism of the pulley 100, enabling the pulley 100 to be opened for rope insertion while connected to an anchor point. The swivel feature further enables the sheave 190 to be properly positioned to receive a rope bight, even after the pulley 100 has been connected to the anchor point.

Figure 3:
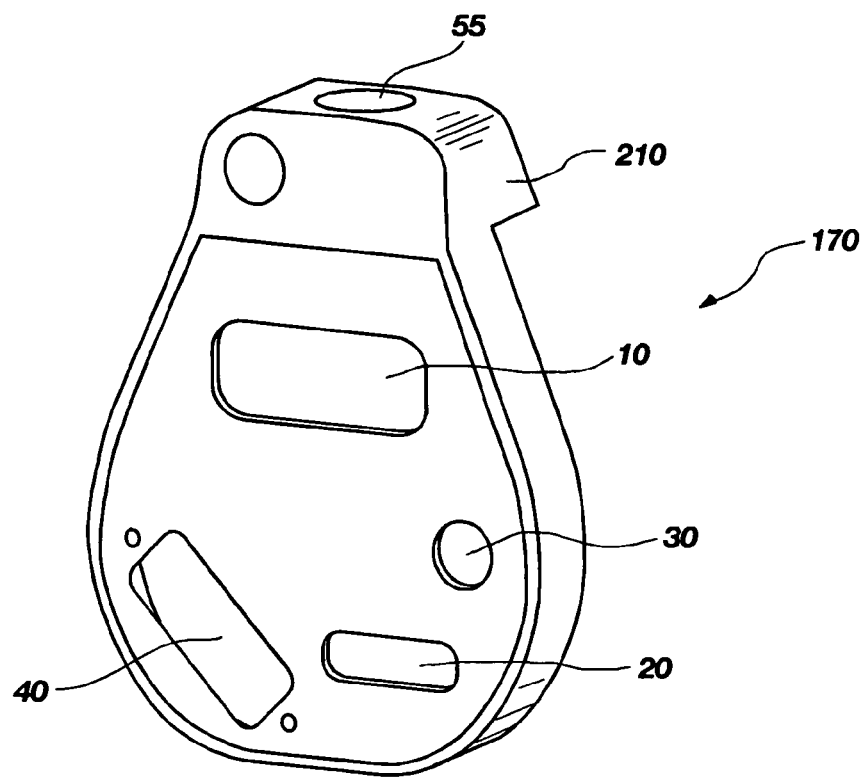
FIG. 3 illustrates a portion of a pulley housing of an exemplary embodiment of a device of the present invention.

The second sideplate 170 and assembly head 210 illustrated in FIG. 3 may include two readout windows 10, 20, corresponding to locations of the first and second signaling devices 110, 120, as depicted in FIG. 1. The readout windows 10, 20 are rectangular, but a readout window of any shape is within the scope of the invention. The present invention additionally contemplates providing one, or more than two, readout windows. A second sideplate 170 without readout windows is also within the scope of the invention wherein, for example, an auditory signaling device may be employed. An on/off switch hole 30 and battery access hole 40 may also be included in the second sideplate 170. The on/off switch 35 may be recessed within the on/off switch hole 30 to prevent accidental engagement and, optionally, may be provided with a cover. The second sideplate 170 and assembly head 210 may be formed of, for example, aluminum, aluminum alloy, nickel-plated aluminum, steel, plastic, or titanium.

The assembly head 210 may include at least one aperture 55 for securing the pulley 100 to another object. The aperture 55 may be a load bearing aperture, sized to provide attachment for at least one carabiner or other connection structure such as the attachment device 250, shown in FIGS. 1 and 2. Additional apertures in the first and second sideplates 160 and 170 or the assembly head 210 may be included to secure the pulley 100 in a fixed position. With the pulley 100 in a fixed position, the rope could run through the pulley 100 between the assembly head 210 and the sheave 190 in a substantially straight line, without wrapping around the sheave 190. A biasing element may be included in the pulley 100 to keep the rope and sheave 190 in contact, ensuring that the rope will cause the sheave 190 to rotate.

The first and second sideplates 160 and 170, and the assembly head 210 form a housing for the sheave 190, positioned between the first sideplate 160 and the second sideplate 170. The sheave 190 may be rotatably or fixedly mounted on the center pin 180, and rotate with or about the center pin 180. The center pin 180 may comprise a structure forming an axle such as a bolt, screw, pin, rod, and the like.

Figure 4:
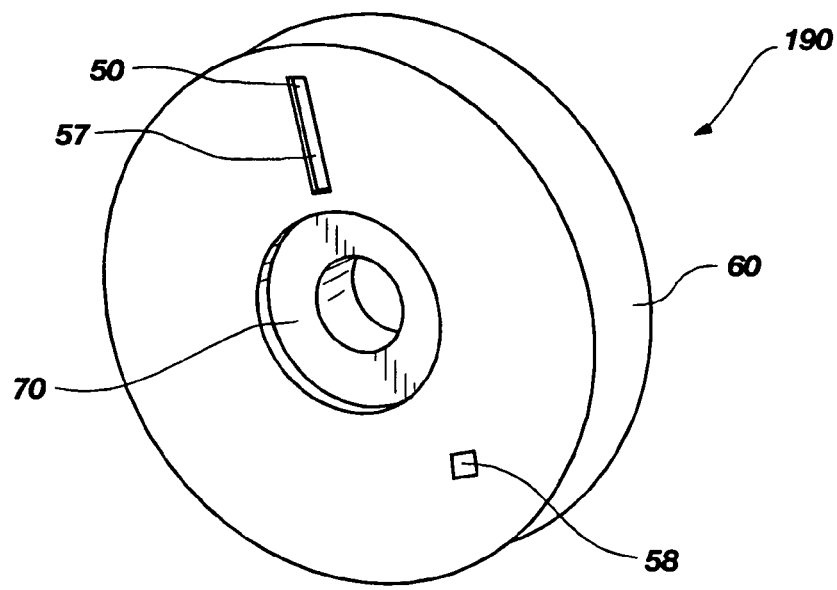
FIG. 4 is a schematic representation of a sheave for a pulley used in a device of the present invention.

FIG. 4 illustrates one exemplary embodiment of a sheave 190 for use with a pulley in a device of the present invention. The sheave 190 comprises a substantially circular component with a groove 60 therein extending around its circumference to support and laterally contain a rope or cable (not shown) and a bearing 70 at its center to permit rotation about a shaft such as the pin 180 (FIG. 2). The sheave may be formed of, for example, aluminum, aluminum alloy, nickel-plated aluminum, steel, plastic, titanium or other (in the exemplary embodiment) nonmagnetic material. Bearing 70 may be formed, for example, of bronze. The sheave 190 of FIG. 4 also has a substantially radially extending groove 50 in a side thereof for receiving a magnet 57. The magnet 57 carried on the sheave 190 selectively activates at least one reed switch 80 on the circuit board 90 of the device (FIG. 6) when in rotational proximity thereto to determine the number of rotations and partial rotations of the sheave 190. A reed switch conventionally comprises two magnetic contacts in a glass tube filled with protective, inert gas to prevent corrosion of the contacts. When a magnet comes close to the reed switch, the two contacts become magnetized and attracted to each other, allowing an electrical current to pass through. When the magnet is moved away from the reed switch the contacts demagnetize, separate, and move to their original position in response to a resilient bias.

The number of rotations and partial rotations of the sheave 190, in combination with the known circumference of the sheave 190, may be used to determine the length of rope that has passed through the device. The number of rotations R multiplied by the circumference C equals the length of rope L. (R*C=L) The use of two or more reed switches 80 allows faster determination time of the sheave rotation, as well as allowing the rotational direction of the sheave 190 to be determined and measurement of smaller increments of rope lengths passing over sheave 190. A processor, for example, a microcontroller, may be used to keep track of the rotational direction of the sheave 190, based on a sequence of activation of the various reed switches 80. The rotational direction of the sheave 190 may be used to determine a net length of rope that has passed through the device in a given direction after the rope has passed therethrough in different directions.

The quantity of revolutions of the sheave within the pulley may, optionally, be determined using optical sensors such as a photogate or a magnetic position sensor such as a Hall Effect position sensor. The photogate may consist of an emitter and detector of light aimed toward each other. The interruption of the beam of light from emitter 58 to detector 81 serves as the triggering event. The emitter may be, for example, a light emitting diode (LED) or a laser. The emitter 58 may be positioned on the sheave 190, as depicted in FIG. 4, and the detector 81 may be carried by the pulley housing, depicted in FIG. 6. Alternatively, detector 81 may comprise a combined photoemitter emitter/detector, and emitter 58 may comprise a reflector to reflect light when passing emitter/detector 81 as sheave 190 rotates. The detector may be a phototransistor, serving as a variable resistor, resistance of which depends on the intensity of detected light.

Figure 5:
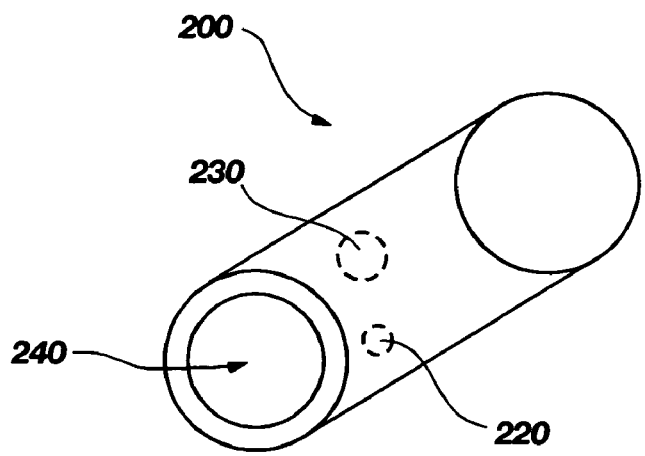
FIG. 5 illustrates another exemplary embodiment of a device of the present invention.

Other optical sensors may be used, for example, as used in an optical mouse, an emitter 220 that bounces light off a surface onto an imaging device 230 (see FIG. 4). For example, an LED may bounce light off a rope onto a complementary metal-oxide semiconductor (CMOS) sensor. The CMOS sensor may send each image to a processing device, for example a digital signal processor (DSP). The DSP may detect patterns in the images and see how those patterns have moved since the previous image. Based on the change in patterns over a sequence of images, the DSP determines the length of rope that has passed through the device. Turning to FIG. 5, a device according to the invention using such an optical sensor may thus be configured in the form of a tube 200, as the rotation of a sheave is not required to determine the rope length. The rope may be passed through the aperture 240 of the tube 200. The tube-shaped device may include signaling devices for transmitting the determined information, as described with respect to the embodiment of the invention depicted in FIG. 1. An optical sensor may require calibration according to the weave of the sheath of the rope.

Figure 6:
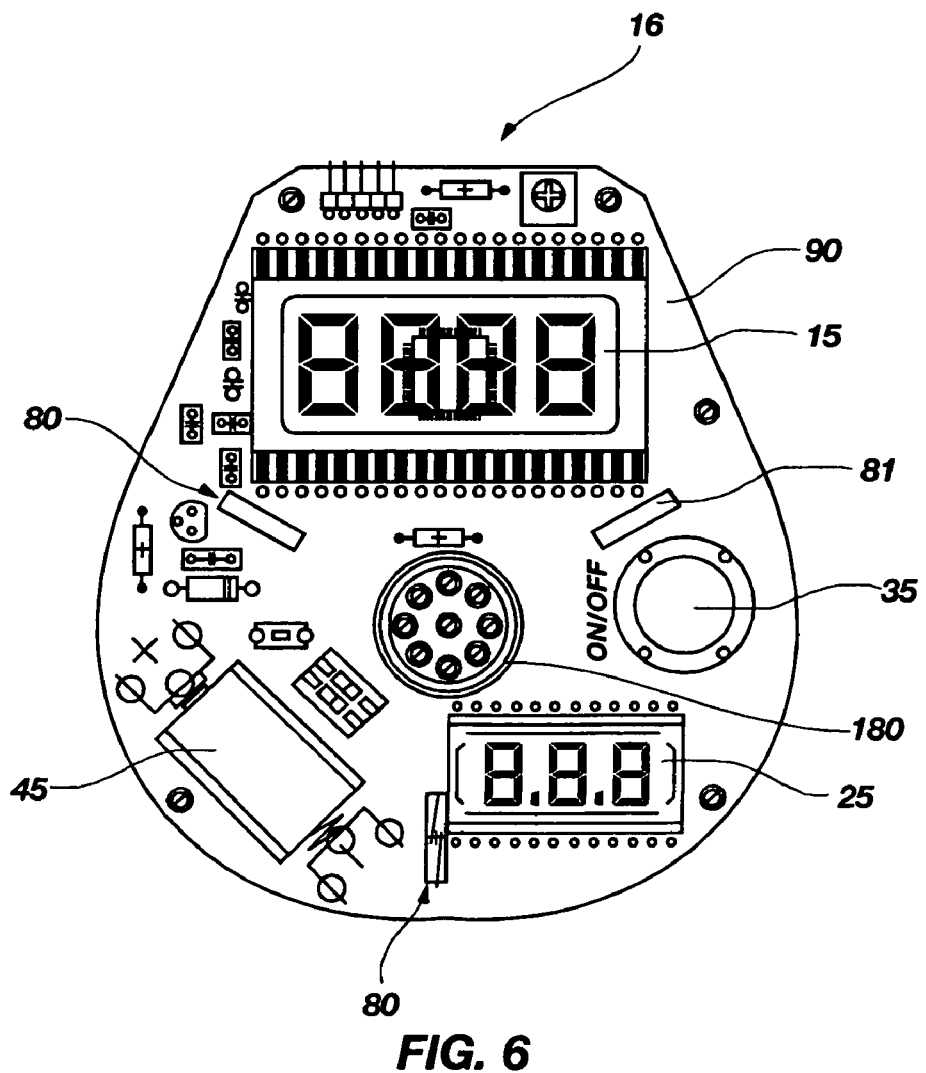
FIG. 6 illustrates an exemplary embodiment of circuitry for a device of the present invention.

FIG. 6 depicts one exemplary embodiment of circuitry 16 that maybe employed in a device of the present invention. The circuitry 16 includes two readout screens 15, 25, corresponding to the signaling devices 110 and 120, an on/off switch 35, and power source, such as a battery 45. Three rotation measuring sensors (for example, reed switch 80 and detector 81) are shown at substantially 120° radial displacement about the pin 180. Two reed switches 80 and one optical detector 81 are shown as exemplary rotation measuring sensors, however circuitry 16 including three reed switches 80 or three optical detectors 81 is within the scope of the present invention. The rotation measuring sensors may alternatively be radially displaced at different, nonuniform angular intervals about the pin 180. Circuitry 16 including any number of rotation measuring sensors (reed switch 80 and detector 81) is within the scope of the present invention.

Figure 7:
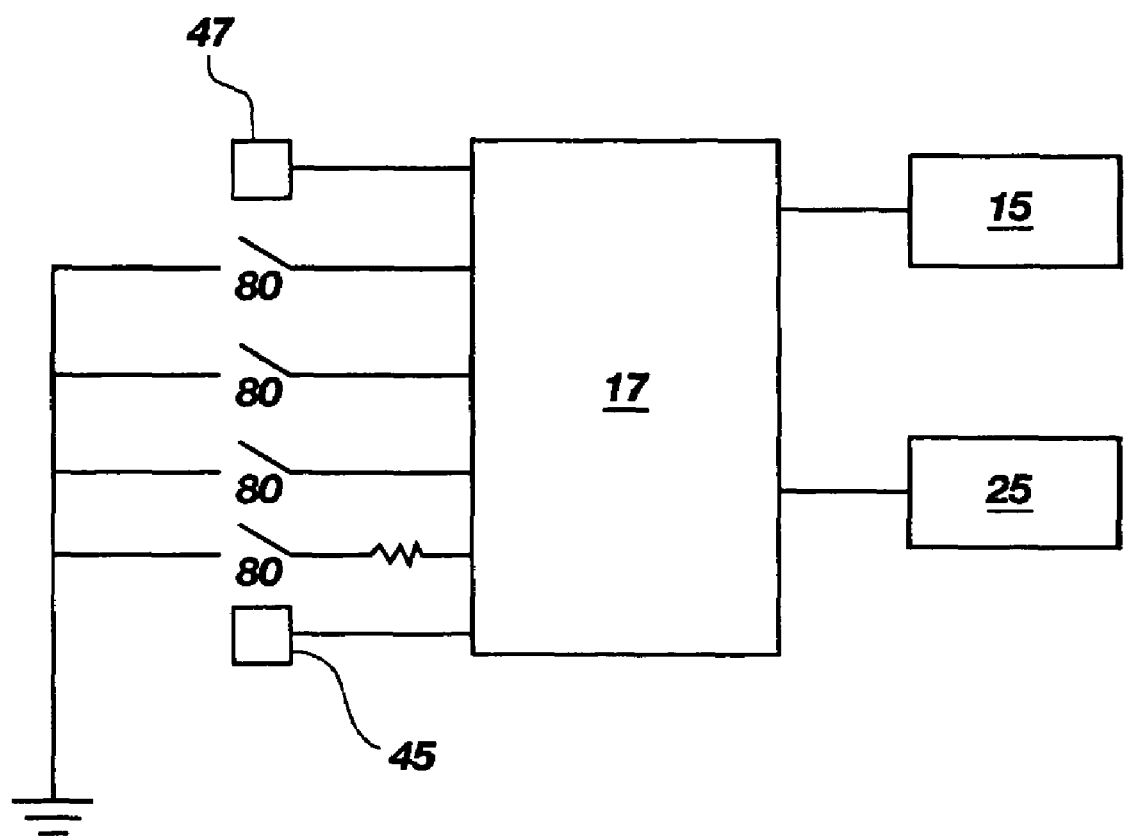
FIG. 7 is a schematic circuitry diagram for the circuitry of FIG. 5.

A diagram of the exemplary circuitry 16 is depicted in FIG. 7. The readout screens 15, 25, are each connected to a processing device, for example, a microcontroller 17. One suitable microcontroller is available from Microchip Technology of Chandler, Ariz. The power supply (for example, battery 45) and clock 47 are also connected to the microcontroller 17. The on/off switch 35 (FIG. 6) and reed switches 80 are coupled to the microcontroller 17. The state of the reed switches 80 may be used by the microcontroller 17 to determine the number of rotations of the sheave 190, and therefore the length of the rope that has passed through the pulley 100. This information, in conjunction with the time measured by clock 47 may be used to determine the speed of the rope.

Figure 8:
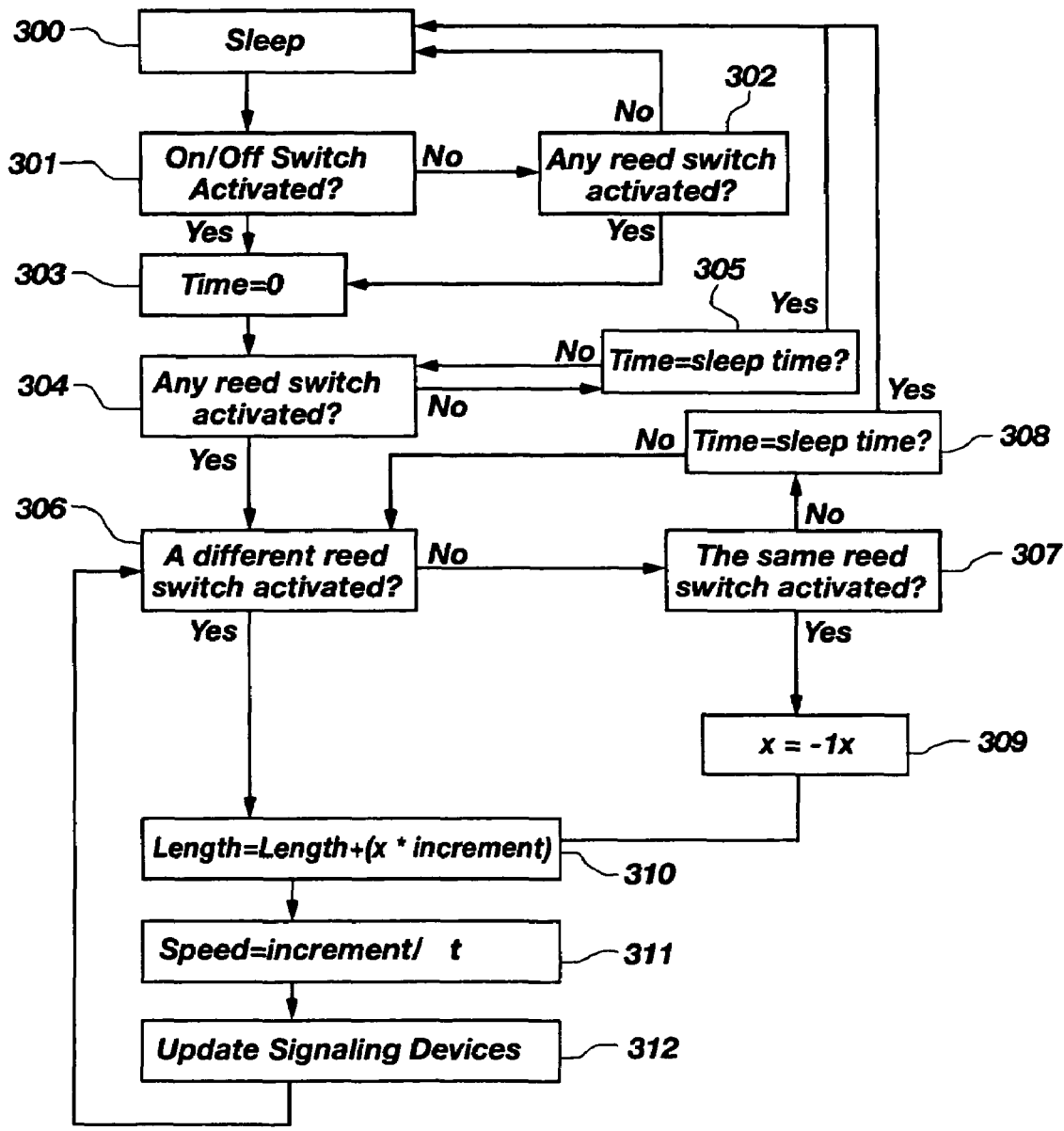
FIG. 8 is a flow diagram of a method of determining the information about a rope passing through a device.

FIG. 8 is a flow diagram of one exemplary method of determining the length of the rope and the speed of the rope. The method may be employed in the form of code within the microcontroller 17. The method is described with respect to a rotation measuring assembly in the form of a plurality of reed switches; however, it will be understood that a rotation measuring assembly in the form of optical sensors or magnetic position sensors as described hereinabove is within the scope of the present invention. The method starts at act 300, with the pulley 100 in sleep mode. Activation of the on/off switch 35 in act 301, or rotation of the sheave, indicated by activation of any of the reed switches 80 by the magnet 57 in act 302 brings the pulley 100 out of sleep mode. The time is set to 0, act 303, and the clock 47 continuously updates the time. Once the pulley 100 is out of sleep mode, activation of a reed switch 80 in act 304 enables the microcontroller 17 to begin determination of the length and/or speed of the rope. Activation of a different reed switch 80 (act 306) by the magnet 57, in a pulley 100 employing a sheave 190 carrying a single magnet 57, indicates that the sheave 190 has rotated a single increment. The measured length may be increased (act 310) by an amount corresponding to the portion of the circumference represented by the arc between the most recently activated two reed switches 80. The speed may measured (act 311) using the increment of rotation divided by the change in time between the activation of the two reed switches 80. Optionally, a moving average of the speed may be measured at certain time intervals.

If the same reed switch 80 is activated twice in a row, the sheave 190 has begun rotating in the opposite direction (act 307). Changing a variable x to –x (act 309) enables the microcontroller 17 to begin subtracting the increments of rotation from the measured rope length The signaling devices 15, 120, for example the readout screens 110, 25, may update (act 312) every time the measured length and speed change. Optionally, the signaling devices 110, 120 may update only a certain intervals, for example a certain time interval or a certain measured interval, for example if the length changes by a whole foot or meter.

If the sheave ceases to rotate for an extended period of time, that is, no reed switches are activated for a certain "sleep" period of time (acts 305, 308), the pulley 100 may return to sleep mode. A length measuring device including the capability to check for certain errors or malfunctions is within the scope of the present invention. For example, if more than one reed switch is activated at the same time, or an unusually high speed has been measured, certain data may be eliminated from the length and speed calculations.

An auditory alarm or other signal may additionally be included, and may be triggered when, for example, a predetermined length of rope has passed through the pulley.

Figure 9:
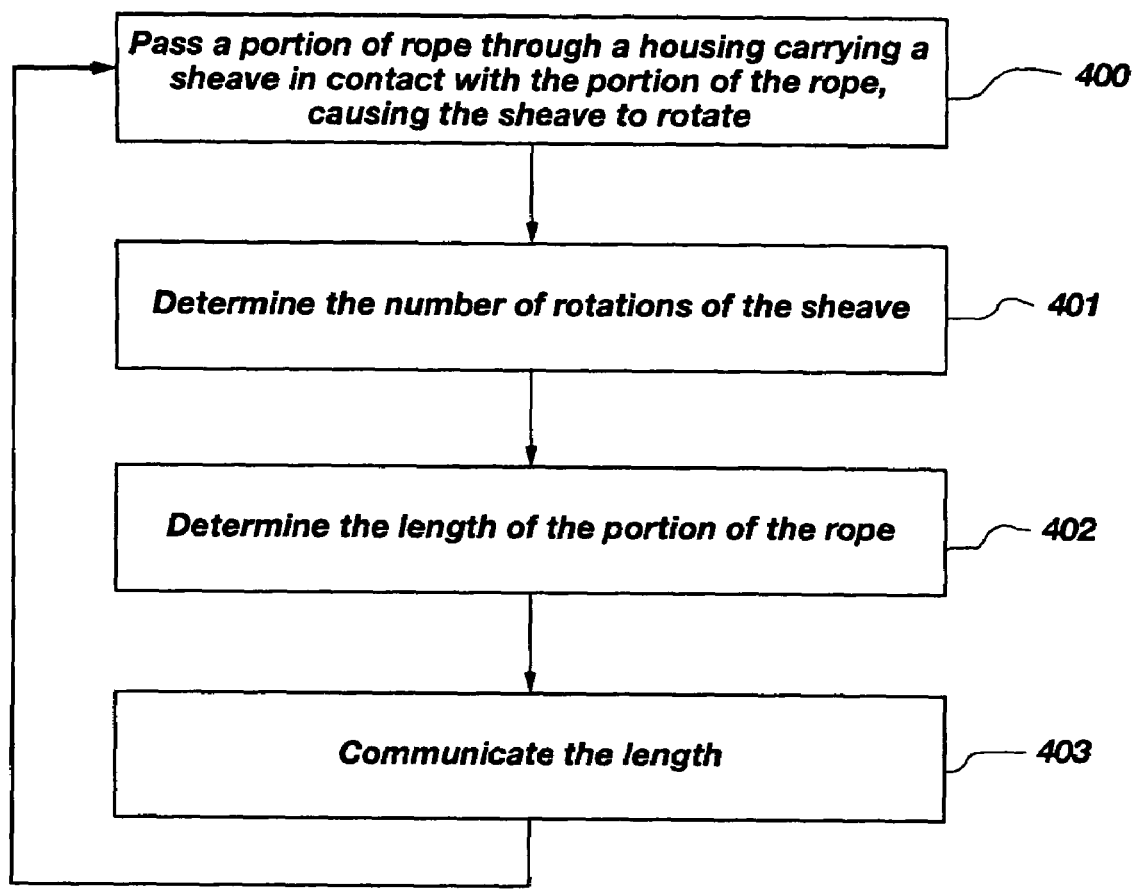
FIG. 9 is a flow diagram of a method of measuring the length of a portion of a rope.

FIG. 9 is a flow diagram of one exemplary method of measuring the length of a portion of rope. In the first act 400, a portion of rope is passed through a housing carrying a sheave in contact with the portion of the rope, causing the sheave to rotate. In act 401, the number of rotations of the sheave is determined. The number of rotations may be determined using any suitable method, for example sensors such as reed switches, optical sensors, or magnetic position sensors. The length of the portion of the rope is determined in act 402, and the length is communicated in act 403.

The length measuring device may additionally function as a load bearing device, for use in climbing, search and rescue, or industrial rescue applications. A load bearing device may be configured to conform to CE (Committee for European Normalization) and UIAA (Union International des Associations d'Alpinisme) standards. Optionally, the device may be a non-load bearing device, used only for communicating information about the rope passing therethrough. In another embodiment, a device for belaying, or arresting a fall, may have rope measuring capabilities.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A rope measuring device comprising:
    a housing configured for allowing a rope to move therethrough;
    a sheave comprising at least one triggering device and mounted for rotation within the housing, the sheave and the housing configured to bear a load applied through the rope;
    a rotation measuring assembly carried by the housing and configured for interaction with the at least one triggering device for measuring a quantity of rotations of the sheave and including a processing device configured for determining information relating to a length of rope moving over the sheave responsive to the quantity of rotations; and
    a signaling device carried by the housing for communicating at least some of the determined information.

2. The rope measuring device of claim 1, wherein the at least one triggering device comprises at least one magnet and the rotation measuring assembly comprises at least one magnetically responsive reed switch.

3. The rope measuring device of claim 2, wherein the at least one magnetically responsive reed switch comprises a plurality of circumferentially spaced, magnetically responsive reed switches.

4. The rope measuring device of claim 3, wherein the plurality of circumferentially spaced, magnetically responsive reed switches comprises three reed switches at 120° intervals.

5. The rope measuring device of claim 1, wherein the rotation measuring assembly comprises at least one optically responsive device.

6. The rope measuring device of claim 5, wherein the triggering device comprises an emitter.

7. The rope measuring device of claim 5, wherein the triggering device comprises a reflector.

8. The rope measuring device of claim 1, wherein the signaling device comprises a LCD screen.

9. The rope measuring device of claim 1, wherein the signaling device comprises an auditory signal.

10. The rope measuring device of claim 1, wherein the rope measuring device is portable.

11. The rope measuring device of claim 1, wherein the quantity of rotations includes partial rotations.

12. The rope measuring device of claim 1, wherein the quantity of rotations includes rotations in opposing directions.

13. The rope measuring device of claim 1, wherein the determined information relating to a length of rope moving over the sheave includes net rope travel in a given direction.

14. The rope measuring device of claim 1, wherein the rotation measuring assembly further comprises a clock operably coupled with the processing device, and the determined information relating to a length of rope moving over the sheave comprises a current rope speed.

15. The rope measuring device of claim 1, wherein the rotation measuring assembly further comprises a clock operably coupled with the processing device, and the determined information relating to a length of rope moving over the sheave comprises an average rope speed.

16. The rope measuring device of claim 1, wherein the rotation measuring assembly further comprises a clock operably coupled with the processing device, and the determined information relating to a length of rope moving over the sheave comprises the maximum rope speed.

17. The rope measuring device of claim 1, wherein the determined information relating to the length of rope comprises the net rope length moved through the rotation measuring device in a given direction.

18. The rope measuring device of claim 1, wherein the rotation measuring assembly further comprises a clock operably coupled with the processing device, and the determined information relating to a length of rope moving over the sheave comprises the rope length moved through the rotation measuring device in a given time period.

19. A method of measuring the length of a portion of a rope used in a climbing application, comprising:
  passing a portion of a rope through a housing carrying a sheave in contact with the portion of the rope, causing the sheave to rotate, the housing and the sheave configured to bear a load applied through the rope;
  triggering a rotation measuring assembly with the sheave and determining a number of rotations of the sheave;
  determining the length of the portion of the rope; and communicating the length.

20. A device for communicating information about an elongated object passing therethrough, comprising:
  a sideplate;
  a pin projecting from the sideplate;
  a sheave mounted for load bearing and rotation about the pin and including a stimulation device;
  a sensory device carried by the sideplate, the sensory device activatable in proximity to the stimulation device for measuring rotation of the sheave;
  a processing device for developing information relating to movement of the elongated object over the sheave responsive to measured rotation thereof; and
  a signaling device carried by the sideplate for communicating the information relating to movement of the elongated object.

21. The device of claim 20, wherein the information about the elongated object comprises a net length of the elongated object moved over the sheave in a given direction.

22. The device of claim 20, further including a clock operably coupled to the processing device, and wherein the information about the elongated object comprises the current speed at which the elongated object is passing through the device.

23. A device for measuring an elongated object comprising:
  a housing configured to include an opening for allowing the elongated object to move therethrough;
  a light emitter mounted within the housing;
  an imaging device configured for receiving light from the light emitter reflected off the elongated object;
  a processing device configured for determining information relating to the length of the elongated object; and
  a signaling device carried by the housing for communicating at least some of the determined information.

* * * * *